(12) United States Patent
Lundberg et al.

(10) Patent No.: US 10,708,636 B2
(45) Date of Patent: Jul. 7, 2020

(54) QUALITY ESTIMATION OF ADAPTIVE MULTIMEDIA STREAMING

(71) Applicant: Telefonaktiebolaget LM Ericsson (publ), Stockholm (SE)

(72) Inventors: Tomas Lundberg, Luleå (SE); Jing Fu, Solna (SE); Gunnar Heikkilä, Gammelstad (SE); David Lindegren, Luleå (SE); Junaid Shaikh, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/309,790

(22) PCT Filed: Jun. 29, 2017

(86) PCT No.: PCT/EP2017/066153
§ 371 (c)(1),
(2) Date: Dec. 13, 2018

(87) PCT Pub. No.: WO2018/002234
PCT Pub. Date: Jan. 4, 2018

(65) Prior Publication Data
US 2019/0124375 A1 Apr. 25, 2019

Related U.S. Application Data

(60) Provisional application No. 62/356,112, filed on Jun. 29, 2016.

(51) Int. Cl.
*H04N 21/234* (2011.01)
*H04N 21/44* (2011.01)
(Continued)

(52) U.S. Cl.
CPC ....... *H04N 21/23418* (2013.01); *H04L 65/80* (2013.01); *H04N 17/004* (2013.01);
(Continued)

(58) Field of Classification Search
CPC .............. H04L 65/80; H04N 21/23805; H04N 21/23418; H04N 21/44008; H04N 21/2402; H04N 21/84
See application file for complete search history.

(56) References Cited

U.S. PATENT DOCUMENTS 7,197,557 B1 *  3/2007  Asar ................... H04L 41/5009
                                              707/999.103
8,339,976 B2    12/2012  Gustafsson et al.
(Continued)

FOREIGN PATENT DOCUMENTS

EP         2530870 A1    12/2012
JP       2010507324 A     3/2010
(Continued)

OTHER PUBLICATIONS

International Telecommunication Union, Standartization Sector, "Parametric non-intrusive assessment of audiovisual media streaming quality", Recommendation ITU-T P.1201, Series P: Terminal and Subjective and Objective Assessment Methods, Models and tools for quality assessment of streamed media, Oct. 1, 2012, pp. 1-32, ITU-T.
(Continued)

*Primary Examiner* — El Hadji M Sall
(74) *Attorney, Agent, or Firm* — Coats + Bennett, PLLC

(57) ABSTRACT

There are provided mechanisms for predicting a multimedia session MOS. The multimedia session comprises a video session and an audio session, wherein video quality is represented by a vector of per-time-unit scores of video (Continued)

quality and wherein audio quality is represented by is a vector of per-time-unit scores of audio quality. The multimedia session is represented by a vector of rebuffering start times of each rebuffering event, a vector of rebuffering durations of each rebuffering event, and an initial buffering duration being the time between an initiation of the multimedia session and a start time of the multimedia session. The method comprises generating audiovisual quality features from the vector of per-time-unit scores of video quality and the vector of per-time-unit scores of audio quality. The audiovisual quality features comprise: a vector of per-time-unit scores of audiovisual quality, calculated as a polynomial function of the vector of per-time-unit scores of video quality and the vector of per-time-unit scores of audio quality; a weighted combination of the per-time-unit scores of audiovisual quality, wherein the weights are exponential functions of a time since the start time of multimedia session and a multimedia session duration; a negative bias representing how a sudden drop in per-time-unit scores of audiovisual quality affects the multimedia session MOS; and a term representing a degradation due to oscillations in the per-time-unit-scores of audiovisual quality. The method comprises generating buffering features from the vector of rebuffering start times of each rebuffering event, calculated from the start time of multimedia session, and the vector of rebuffering durations of each rebuffering event. The method comprises estimating a multimedia session MOS from the generated audiovisual quality features and the generated buffering features.

15 Claims, 10 Drawing Sheets

(51) Int. Cl.
| | | |
|---|---|---|
| H04N 21/84 | (2011.01) | |
| H04N 17/00 | (2006.01) | |
| H04N 21/24 | (2011.01) | |
| H04L 29/06 | (2006.01) | |
| H04N 21/238 | (2011.01) | |

(52) U.S. Cl.
CPC . *H04N 21/23406* (2013.01); *H04N 21/23805* (2013.01); *H04N 21/24* (2013.01); *H04N 21/2402* (2013.01); *H04N 21/44008* (2013.01); *H04N 21/84* (2013.01)

(56) References Cited

U.S. PATENT DOCUMENTS

| | | |
|---|---|---|
| 9,532,240 B2 | 12/2016 | Masuda et al. |
| 2013/0083203 A1* | 4/2013 | Barrett ............... H04L 43/0829 348/180 |
| 2013/0114482 A1* | 5/2013 | Oh ..................... H04L 12/6418 370/310 |
| 2015/0033026 A1* | 1/2015 | Roelse .................... G09C 5/00 713/176 |
| 2017/0063959 A1* | 3/2017 | Roncero Izquierdo ..................... H04L 65/4069 |

FOREIGN PATENT DOCUMENTS

| | | |
|---|---|---|
| JP | 2014183424 A | 9/2014 |
| JP | 2015122638 A | 7/2015 |

OTHER PUBLICATIONS

International Telecommunication Union, Standartization Sector, "Parametric bitstream-based quality assessment of progressive download and adaptive audiovisual streaming services over reliable transport", Recommendation ITU-T P.1203, Series P: Telephone Transmission Quality, Telephone Installations, Local Line Networks, Models and tools for quality assessment of streamed media, Oct. 1, 2017, pp. 1-22, ITU-T.
Jorgen, et al., "Draft Recommendation P.1203.3", International Telecommunication Union Telecommunication Standardization Sector, Study Group 12, TD 1065 R3 (GEN/12), Oct. 1, 2016, pp. 1-17, Munich, Germany.
Raake A., et al, "Draft Appendices to P.1201.1 and P.1201.2 on diagnostic information (work item P.DNAMS) (for agreement)", International Telecommunication Union Telecommunication Standardization Sector, Study Group 12, TD 324 Rev.3 (GEN/12), Dec. 3, 2013, pp. 1-9, Geneva, Switzerland.
Samet, N. et al., "Real-Time User Experience evaluation for Cloud-based Mobile Video", 2016 30th International Conference on Advanced Information Networking and Applications Workshops (WAINA), Mar. 23, 2016, pp. 204-208, IEEE.
Satti, S-M, et al., "Long-term Quality Evaluation in OTT Video", 2016 Picture Coding Symposium (PCS), Dec. 4, 2016, pp. 1-5, IEEE.
International Telecommunication Union, "Opinion model for network planning of video and audio streaming applications", series G: Transmission Systems and Media, Digital Systems and Networks, Multimedia Quality of Service and performance—Generic and user-related aspects, ITU-T G.1071, Jun. 1, 2015, pp. 1-33, ITU-T.
Liu, Y. et al., "Deriving and Validating User Experience Model for DASH Video Streaming", IEEE Transactions on Broadcasting, vol. 61, Issue 4, Aug. 25, 2015, pp. 651-665, IEEE.

\* cited by examiner ered across 200 countries by 2020.
QUALITY ESTIMATION OF ADAPTIVE MULTIMEDIA STREAMING

TECHNICAL FIELD

This invention relates to a method, a MOS estimator, a computer program and a computer program product for predicting multimedia session MOS (Mean Opinion Score).

BACKGROUND

Streaming media is more popular than ever, as both consumer and enterprise users increase content consumption. It is used on social media such as YouTube, Twitter, and Facebook, and of course also by the providers of on-demand video services such as Netflix. According to some reports, Netflix and YouTube together make up half of peak Internet traffic in North America. Moreover, the number of subscription video on demand homes is forecast to reach 306 million across 200 countries by 2020.

When the transmission capacity in a network fluctuates, for instance for a wireless connection, the media player can often select to adapt the bitrate, so that the video can still be delivered, albeit with sometimes worse quality (lower bitrate, lower resolution etc.). An example is shown in FIG. 1A for a 60-second video, where the segment heights represents the bitrate, and each segment is 5 second long. In almost all cases, the quality will vary in a corresponding way, i.e. higher bitrate will give a higher quality, and lower bitrate will give a lower quality.

It is therefore of vital importance for providers to estimate the users' Quality of Experience (QoE), which is fundamentally the subjective opinion of the quality of a service. For this purpose, subjective test may be used, where a panel of viewers are asked to evaluate the perceived quality of streaming media. Typically, the quality is given on a scale from 1 ("bad") to 5 ("excellent"), and is then averaged over all viewers, forming a Mean Opinion Score (MOS). However, these subjective tests are costly, both in time and money, and, to circumvent this, objective QoE estimation methods ("objective quality models") have been developed.

Mean Opinion Score (MOS) is a measure of subjective opinion of users about a service or application performance. It has been widely used to evaluate the quality of multimedia applications. The ITU-T Recommendation P. 800 has standardized the use of MOS on a 5-point Absolute Category Rating (ACR) scale for evaluation of the audio-visual test sequences. The ACR scale ranges from 5 (Excellent) to 1 (Bad). This method is particularly relevant in scenarios where a user is presented with one test sequence at a time and then asked to rate it.

Different objective quality models are normally used for audio and video. The models estimate the quality degradation due to the coding itself, taking into account parameters such as bitrate (audio and video), sampling rate (audio), number of channels (audio), resolution (video), frame rate (video), GOP size (video, a parameter related to video coding), etc. The output from the audio or video quality model for a complete session (as in the picture above) is typically a list of objective MOS scores, where each score represents the quality for an individual media segment (i.e. each score represents the quality during 5 seconds in the figure above). Examples of the audio and video coding quality models can be found in the ITU-T P.1201 recommendation.

When created, the audio and video quality models are trained on a set of subjective tests. This is accomplished in the following manner: a specific number of parameters are varied and multimedia clips are produced using these parameters. These clips are then graded by viewers during a subjective test, and the quality models are then made to as closely as possible (in some sense) match the results from the subjective tests.

Typically, the models are trained on shorter signal segments, typically around 5 to 10 seconds, where the media quality is more or less constant during the clip. This means that the models in principle only give accurate results when presented with segments of corresponding durations, and where no major quality variations are present. To obtain an objective score for a multimedia clip that is much longer than this, an aggregation model is needed. Due to non-linear human perception processing it is not just possible to e.g. average the individual segment scores.

An aggregation model also combines the audio and video model quality scores into combined media scores, representing the total perception of the media. Another task for the aggregation model is to take into account degradations due to buffering. Buffering occurs when the transmission speed in the network is not high enough so that more data is consumed in the media player than what is delivered by the network. This will cause "gaps" in the media play-out during which the media player fills up its data buffer, as exemplified in FIG. 1B. The aggregation model will consequently in the end need to take both these effects into account, both a varying intrinsic audio and video quality, and degradations due to bufferings, as in the more complex example shown in FIG. 10.

The buffering can be either initial buffering (before any media is presented to the user) or possible rebufferings during play-out.

SUMMARY

Existing buffer aggregation models, e.g. as in ITU-T P.1201, have so far been limited to session lengths of up to one minute, which is much too short for a typical video session, e.g. YouTube. With longer sequences, human memory effects also start to be noticeable, meaning that people remember less of a what they saw longer back in time, and thus mostly rate the quality of the video after the last parts. This is not handled in existing models. To accurately mimic the total effect of quality adaptations, different resolutions, buffering and longer session times, a more complex model is needed.

It is an object to improve how Mean Opinion Scores are predicted.

A first aspect of the embodiments defines a method, performed by a Mean Opinion Score, MOS, estimator, for predicting a multimedia session MOS. The multimedia session comprises a video session and an audio session, wherein video quality is represented by a vector of per-time-unit scores of video quality and wherein audio quality is represented by is a vector of per-time-unit scores of audio quality. The multimedia session is represented by a vector of rebuffering start times of each rebuffering event, a vector of rebuffering durations of each rebuffering event, and an initial buffering duration being the time between an initiation of the multimedia session and a start time of the multimedia session. The method comprises generating audiovisual quality features from the vector of per-time-unit scores of video quality and the vector of per-time-unit scores of audio quality. The audiovisual quality features comprise: a vector of per-time-unit scores of audiovisual quality, calculated as a polynomial function of the vector of per-time-unit scores of video quality and the vector of per-time-unit scores of audio quality; a weighted combination of the per-time-unit scores of audiovisual quality, wherein the weights are exponential functions of a time since the start time of multimedia session and a multimedia session duration; a negative bias representing how a sudden drop in per-time-unit scores of audiovisual quality affects the multimedia session MOS; and a term representing a degradation due to oscillations in the per-time-unit-scores of audiovisual quality. The method comprises generating buffering features from the vector of rebuffering start times of each rebuffering event, calculated from the start time of multimedia session, and the vector of rebuffering durations of each rebuffering event. The method comprises estimating a multimedia session MOS from the generated audiovisual quality features and the generated buffering features.

A second aspect of the embodiments defines a Mean Opinion Score, MOS, estimator, for predicting a multimedia session MOS. The multimedia session comprises a video session and an audio session, wherein video quality is represented by a vector of per-time-unit scores of video quality and wherein audio quality is represented by is a vector of per-time-unit scores of audio quality. The multimedia session is represented by a vector of rebuffering start times of each rebuffering event, a vector of rebuffering durations of each rebuffering event, and an initial buffering duration being the time between an initiation of the multimedia session and a start time of the multimedia session. The MOS estimator comprises processing means operative to generate audiovisual quality features from the vector of per-time-unit scores of video quality and the vector of per-time-unit scores of audio quality. The audiovisual quality features comprise a vector of per-time-unit scores of audiovisual quality, calculated as a polynomial function of the vector of per-time-unit scores of video quality and the vector of per-time-unit scores of audio quality; a weighted combination of the per-time-unit scores of audiovisual quality, wherein the weights are exponential functions of a time since the start time of multimedia session and a multimedia session duration; a negative bias representing how a sudden drop in per-time-unit scores of audiovisual quality affects the multimedia session MOS; and a term representing a degradation due to oscillations in the per-time-unit-scores of audiovisual quality. The MOS estimator comprises processing means operative to generate buffering features from the vector of rebuffering start times of each rebuffering event, calculated from the start time of multimedia session, and the vector of rebuffering durations of each rebuffering event. The MOS estimator comprises processing means operative to estimate a multimedia session MOS from the generated audiovisual quality features and the generated buffering features.

A third aspect of the embodiments defines a computer program for a Mean Opinion Score, MOS, estimator, for predicting a multimedia session MOS. The multimedia session comprises a video session and an audio session, wherein video quality is represented by a vector of per-time-unit scores of video quality and wherein audio quality is represented by is a vector of per-time-unit scores of audio quality. The multimedia session is represented by a vector of rebuffering start times of each rebuffering event, a vector of rebuffering durations of each rebuffering event, and an initial buffering duration being the time between an initiation of the multimedia session and a start time of the multimedia session. The computer program comprises a computer program code which, when executed, causes the computer program to generate audiovisual quality features from the vector of per-time-unit scores of video quality and the vector of per-time-unit scores of audio quality. The audiovisual quality features comprise a vector of per-time-unit scores of audiovisual quality, calculated as a polynomial function of the vector of per-time-unit scores of video quality and the vector of per-time-unit scores of audio quality; a weighted combination of the per-time-unit scores of audiovisual quality, wherein the weights are exponential functions of a time since the start time of multimedia session and a multimedia session duration; a negative bias representing how a sudden drop in per-time-unit scores of audiovisual quality affects the multimedia session MOS; and a term representing a degradation due to oscillations in the per-time-unit-scores of audiovisual quality. The computer program comprises a computer program code which, when executed, causes the computer program to generate buffering features from the vector of rebuffering start times of each rebuffering event, calculated from the start time of multimedia session, and the vector of rebuffering durations of each rebuffering event. The computer program comprises a computer program code which, when executed, causes the computer program to estimate a multimedia session MOS from the generated audiovisual quality features and the generated buffering features.

A fourth aspect of the embodiments defines a computer program product comprising computer readable means and a computer program according to the third aspect, stored on the computer readable means.

Advantageously, at least some of the embodiments provide a MOS estimator that handles both short and long video sessions, and gives a more accurate MOS score The MOS estimator according to at least some of the embodiments is relatively low-complex in terms of computational power and can easily be implemented in all environments.

It is to be noted that any feature of the first, second, third and fourth aspects may be applied to any other aspect, whenever appropriate. Likewise, any advantage of the first aspect may equally apply to the second, third and fourth aspect respectively, and vice versa. Other objectives, features and advantages of the enclosed embodiments will be apparent from the following detailed disclosure, from the attached dependent claims and from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE PROPOSED SOLUTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The subjective MOS is how humans rate the quality of a multimedia sequence. Objective MOS estimation is using models to predict/estimate how humans will rate it. In general, parametric based methods are usually used to predict the multimedia MOS. This kind of parametric based methods usually results in quite a large prediction error.

The basic idea of embodiments presented herein is to predict the multimedia session MOS. The multimedia session comprises a video session and an audio session, wherein video quality is represented by a vector of per-time-unit scores of video quality and wherein audio quality is represented by a vector of per-time-unit scores of audio quality. The multimedia session is further represented by a vector of rebuffering start times of each rebuffering event, a vector of rebuffering durations of each rebuffering event, and an initial buffering duration being the time between an initiation of the multimedia session and a start time of the multimedia session.

A time unit may be a second. Thus, the lists of per time unit scores of the video and audio quality may be obtained per second. For example, a 300 second clip has audio and video vectors with 300 elements each.

Initial buffering duration may also be expressed in seconds. For example, an 8-second initial buffering (which has a start time at 0 seconds) has a duration of 8 seconds. Rebuffering duration and location may also be expressed in seconds. Start times are in media time, so it doesn't depend on a duration of any previous buffering.

Figure 2:
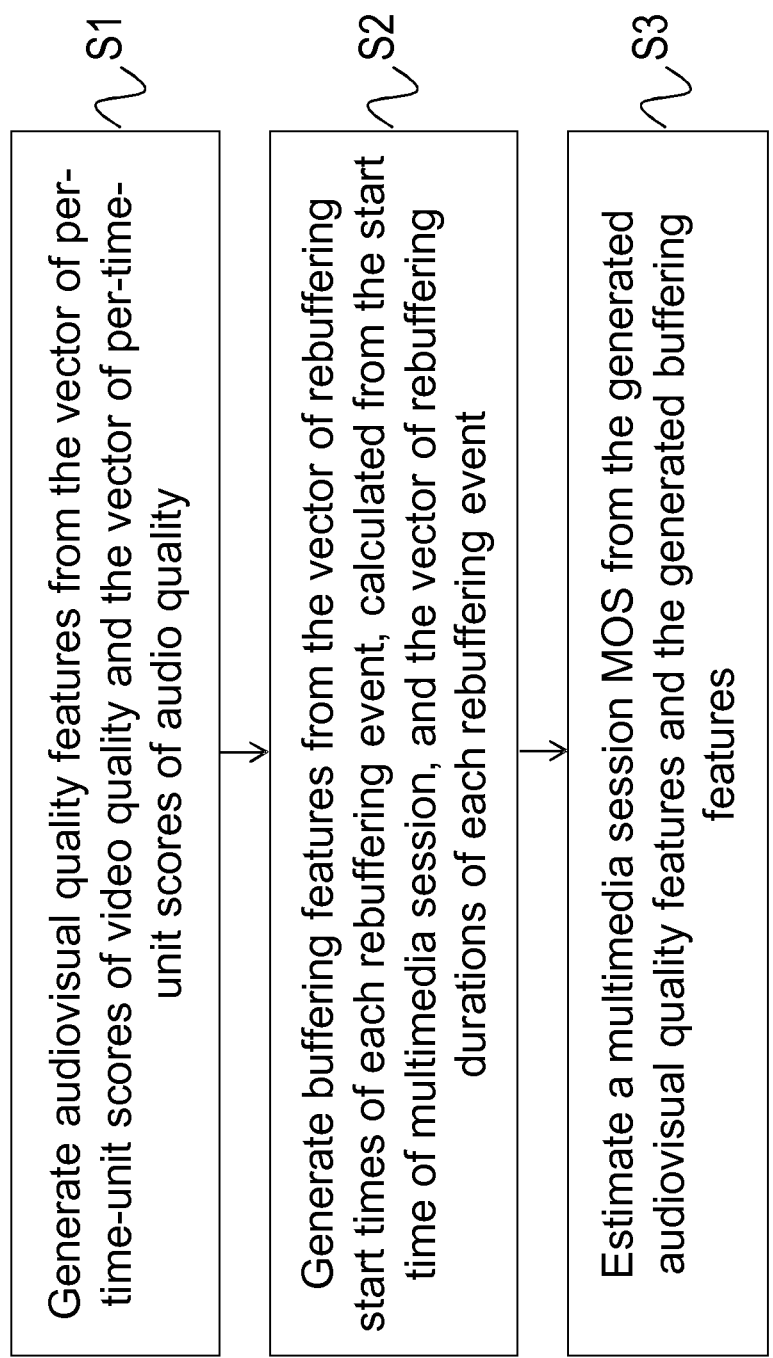
FIG. 2 illustrates the steps performed by a MOS estimator according to the embodiments of the present invention.

According to one aspect, a method, performed by a MOS, Mean Opinion Score, estimator, for predicting a multimedia session MOS is provided, as described in FIG. 2. The method comprises a step S1 of generating audiovisual quality features from the vector of per-time-unit scores of video quality and the vector of per-time-unit scores of audio quality.

The audiovisual quality features comprise a vector of per-time-unit scores of audiovisual quality, calculated as a polynomial function of the vector of per-time-unit scores of video quality and the vector of per-time-unit scores of audio quality. That is, video quality and audio quality are "merged" to a measure of a combined quality, mosBoth. This merge is known from ITU-T P.1201. For example, as given in a source code below, a per-time-unit score of audiovisual quality may be calculated as:

$$mosBoth[i] = \frac{(mosV[i]-1) + c[17]\cdot(mosA[i]-1) + c[18]\cdot(mosV[i]-1)\cdot\frac{mosA[i]-1}{4}}{1 + c[17] + c[18]} + 1$$

wherein mosV and mosA respectively are vectors of per-time-unit scores of video and audio quality, and c[17] and c[18] are audio and video merging weights. For example, c[17] may be set to 0.16233, and c[18] to −0.013804, but the present invention is by no means limited to these specific values.

Figure 3:
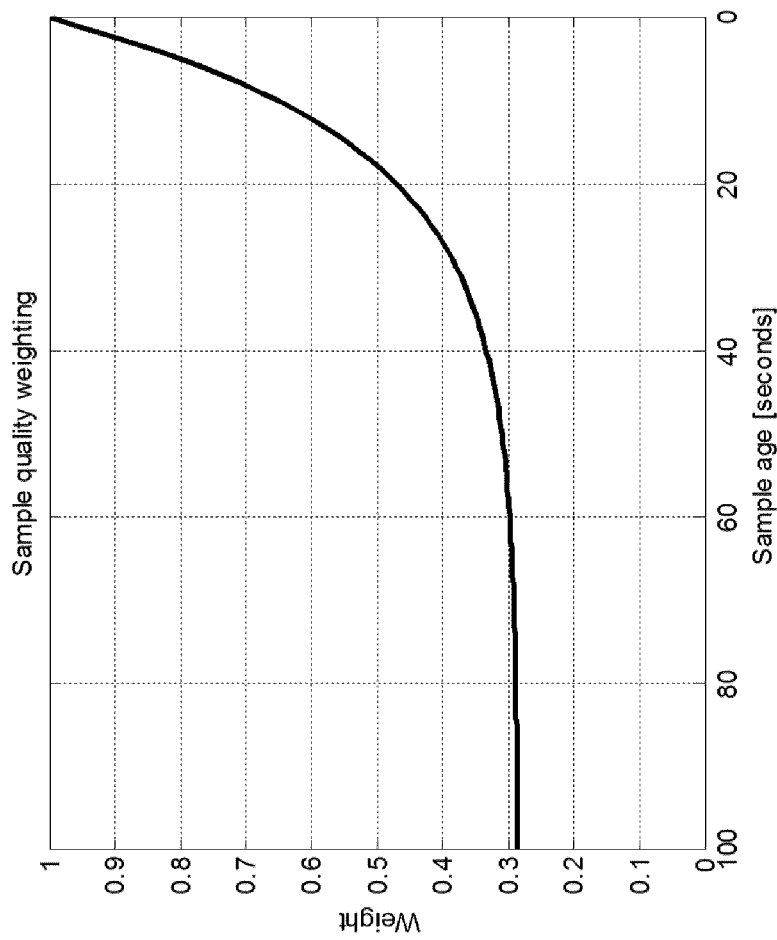
FIG. 3 illustrates the weight factor as a function of a sample age according to the embodiments of the present invention.

The audiovisual quality features further comprise a weighted combination of the per-time-unit scores of audiovisual quality, wherein the weights are exponential functions of the time since the start time of multimedia session and the multimedia session duration. Namely, due to memory effects, media played longer back in time and thus longer back in memory is slightly forgotten, and is thus weighted down. The weighted combination of the per-time-unit scores of audiovisual quality is referred to as "mosBasic". An example of the weights as functions of a difference between the multimedia session duration and the time since the start time (depicted as a sample age here) of multimedia session is shown in FIG. 3. A source code below demonstrates how mosBasic may be calculated:

```
for i in range(mosLength):
    mosBoth[i] = (1 * (mosV[i] − 1) + c[17] * (mosA[i] − 1) + c[18] *
(mosV[i] − 1) * (mosA[i] − 1) / 4) / (1 + c[17] + c[18]) + 1
    mosTime   = mosLength − i − 1
    mosWeight = exponential([1, c[1], 0, c[2]], mosTime)
    sum1     += mosBoth[i] * mosWeight
    sum2     += mosWeight
mosBasic = sum1 / sum2
``` wherein mosLength corresponds to the multimedia session duration, mosTime corresponds to the difference between the multimedia session duration and the time since the start time of multimedia session, and c[1] and c[2] are memory adaptation weights. For example, c[1] may be set to 0.2855, and c[2] to 10.256, but the present invention is by no means limited to these specific values.

The audiovisual quality features further comprise a negative bias. The negative bias represents how a sudden drop in per-time-unit scores of audiovisual quality affects the multimedia session MOS. When media quality varies, one is more affected by a sudden drop in quality, as compared to a similar sudden improvement. This effect is captured by the negative bias. The negative bias may be modelled by calculating the offsets for each per-time-unit (e.g., one-second) quality score towards mosBasic. These offsets may also be scaled by the forgetting factor weight, so that media longer back in memory gets less impact.

From this vector of weighted per-time-unit (i.e., one-second) offsets, a certain percentile can be calculated. For example, it may be an ~10th percentile, but it could be a different percentile as well. This is usually a negative number, as the lowest quality scores in the vectors should normally be lower than mosBasic, so the result is negated into a positive value, meaning a higher value now indicates a higher impact of the negative bias. This is then scaled linearly to the right range. An example of a source code for calculating the negative bias is as:

```
mosOffset = list(mosBoth)
for i in range(mosLength) :
    mosTime   = mosLength – i – 1
    mosWeight = exponential([1, c[1]1, 0, c[2] , mosTime)
    mosOffset[i] = (mosOffset[i] – mosBasic) *mosWeight
mosPerc = np.percentile(mosOffset, c[22], interpolation='linear')
negBias = np.maximum(0, –mosPerc)
negBias = negBias*c[23]
```

Equivalently, the negative bias is calculated as follows:

$$negBias = \max\left(0, -10th \text{ percentile of } \left[\text{per-time-unit scores of audiovisual quality } [t] \cdot \left(c[1] + (1-c[1]) \cdot e^{-\frac{(T-t)\log(0.5)}{-c[2]}}\right)\right]\right) \cdot c[23]$$

wherein t is time since the start time of multimedia session and T is the multimedia session duration. Here c[22] and c[23] represent negative bias coefficients. For example, c[22] may be set to 9.1647, and c[23] to 0.74811, but the present invention is by no means limited to these specific values.

The audiovisual quality features comprise a term representing a degradation due to oscillations in the per-time-unit-scores of audiovisual quality. Namely, when media quality fluctuates this is annoying, and the effect of quality fluctuation is caught by counting the number of tops and dips where the unweighted one-second media quality scores (mosBoth) goes above or below mosBasic. In other words, the term representing a degradation due to oscillations in the per-time-unit scores of audiovisual quality may be calculated as the number of occurrences when the absolute difference between the per-time-unit scores of the audiovisual quality and the weighted combination of the per-time-unit scores of audiovisual quality exceeds a given threshold value, divided by the multimedia session duration. The threshold value may be used to disregard small variations that may not be perceivable. An example for the threshold value is 0.1, i.e., a hysteresis of 0.1 is used.

The term representing a degradation due to oscillations, oscDeg, in the per-time-unit-scores of audiovisual quality may also be truncated so that the maximum value is 0.2 oscillations per second. This may then multiplied by a standard deviation of the per-time unit (i.e., per-second) audiovisual quality values, so that higher level of oscillations gets a higher impact. The following source code illustrates how the term representing a degradation due to oscillations can be calculated:

```
osc   = 0
  offset = 0.1
  state  = 0
  for i in range(mosLength):
      if state != 1:
          if mosBoth[i] > mosBasic + offset:
              osc   += 1
              state  = 1
      elif state != –1:
          if mosBoth[i] < mosBasic – offset:
              osc   += 1
              state =–1
  oscRel = osc / mosLength
  oscRel = np.minimum(oscRel, 0.2) # Limit to one change per 5 sec
  oscDeg = np.power(oscRel * np.std(mosBoth, ddof=1), c[19]) * c[20]
```

The result may then be scaled non-linearly (approximately squared), and finally linearly scaled to the right range.

The method comprises a step S2 of generating buffering features from the vector of rebuffering start times of each rebuffering event, calculated from the start time of multimedia session, and the vector of rebuffering durations of each rebuffering event.

The generated buffering features may comprise a term representing a degradation due to initial buffering, initDeg, and a term representing a degradation due to rebuffering, bufDeg.

The term representing degradation due to initial buffering may be modeled as a product of a term representing an initial buffering impact and a term representing a forgetness factor impact.

Figure 4:
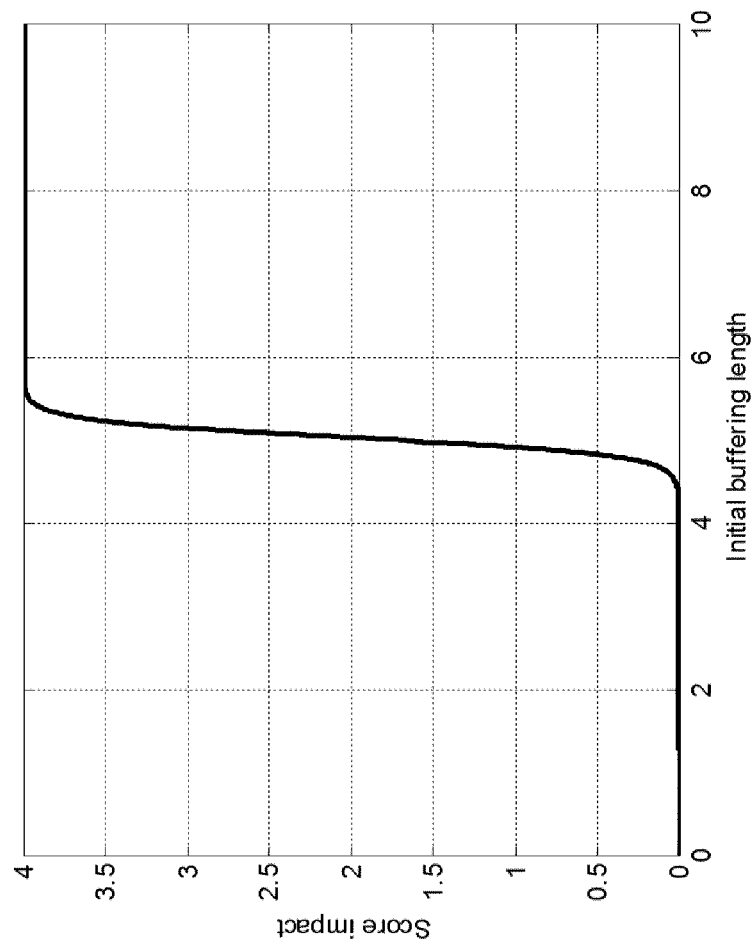
FIG. 4 shows an initial buffering impact as a function of initial buffering duration according to the embodiments of the present invention.

The initial buffering impact may be a sigmoid function of the initial buffering duration. For example, the sigmoid function may basically give a zero impact below 5 seconds and an impact of 4 if the initial buffering duration is longer than that, as shown in FIG. 4. The source code for calculating iniDeg may be as follows:

```
lengthDeg = sigmoid([0, 4, c[10], c[10] + c[11]], bufInit)
memoryDeg = exponential([1, c[4], 0, c[5]], mosLength)
initDeg   = lengthDeg*memoryDeg
```

Here c[10] and c[11] are constants related to initial buffering and c[4] and c[5] are memory weights related to initial buffering. For example, c[10]=4.5327, c[11]=1.0054, c[4]=0.054304 and c[5]=10.286, but the present invention is by no means limited to these specific values.

Figure 5:
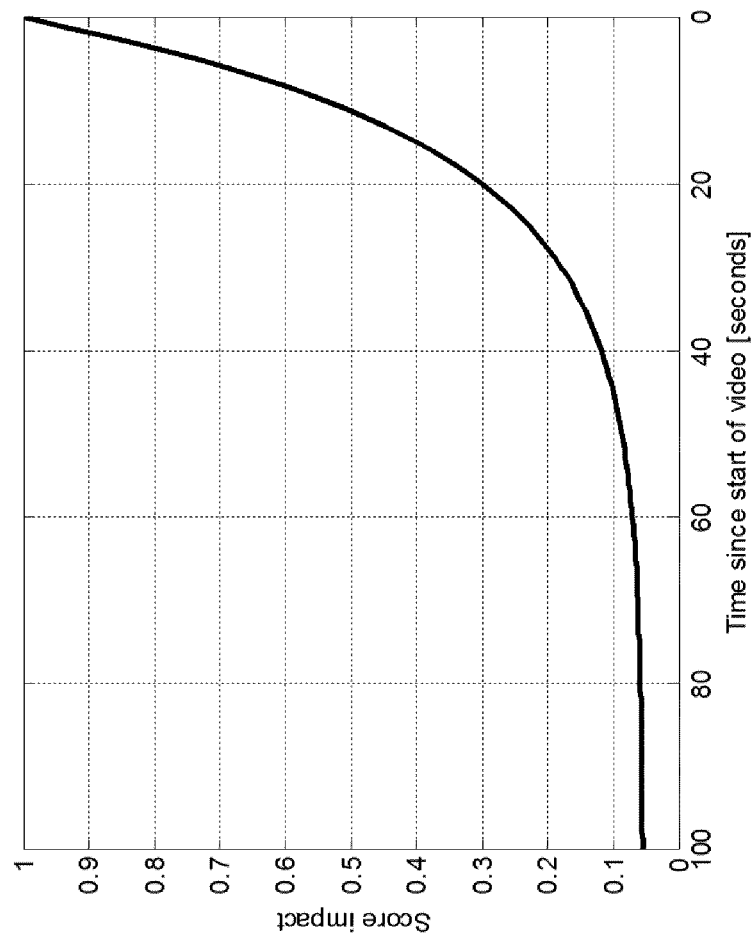
FIG. 5 shows a forgetness factor impact as a function of time since the start time of multimedia session, according to the embodiments of the present invention.

However, the impact from initial buffering is only annoying during the initial buffering itself or close after. If the media continues to stream, this problem is forgotten quite soon. Thus, the second modelling is to weight the initial buffering impact with a forgetness factor. The forgetness factor may be an exponential function of the time since the start time of multimedia session, as shown in FIG. 5.

Figure 6:
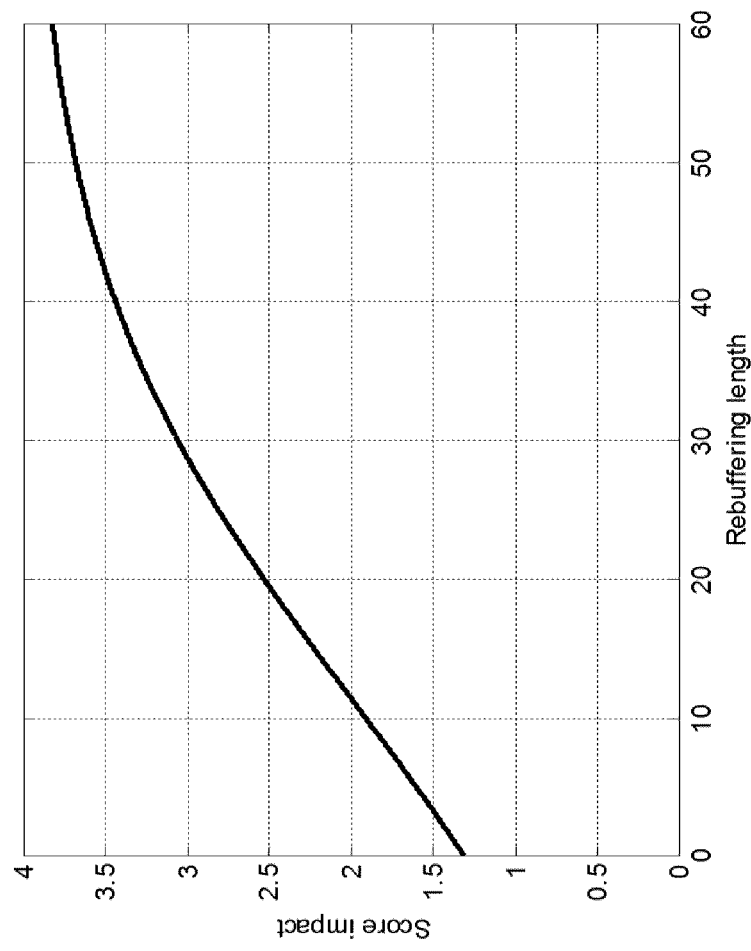
FIG. 6 illustrates a rebuffering duration impact as a function of rebuffering duration, according to the embodiments of the present invention.

The term representing degradation due to rebuffering, bufDeg, may be modeled as a sum, over all rebuffering events, of products of a rebuffering duration impact, a rebuffering repetition impact, and an impact of time since the last rebuffering. For each rebuffering instance, first the impact of the rebuffering is calculated. The rebuffering duration impact may be a sigmoid function of a rebuffering duration, as shown in FIG. 6.

Figure 7:
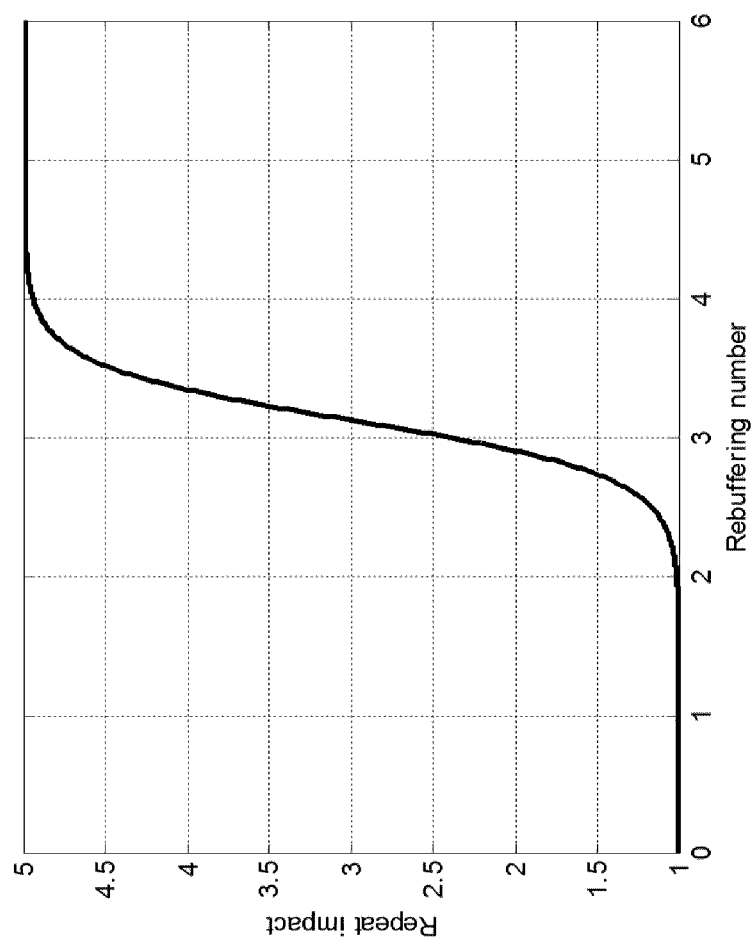
FIG. 7 illustrates a rebuffering repetition impact as a function of rebuffering repetition number, according to the embodiments of the present invention.

However, the rebuffering duration impact only models a single rebuffering, evaluated close to the time when the rebuffering happened. If there are more rebufferings, one gets more annoyed for each additional one. This is modeled by the rebuffering repetition impact. The rebuffering repetition impact may be a sigmoid function of a rebuffering repetition number, as shown in FIG. 7. For example, a weight of up to 5 is assigned when the number of rebufferings becomes 4 or more.

Figure 8:
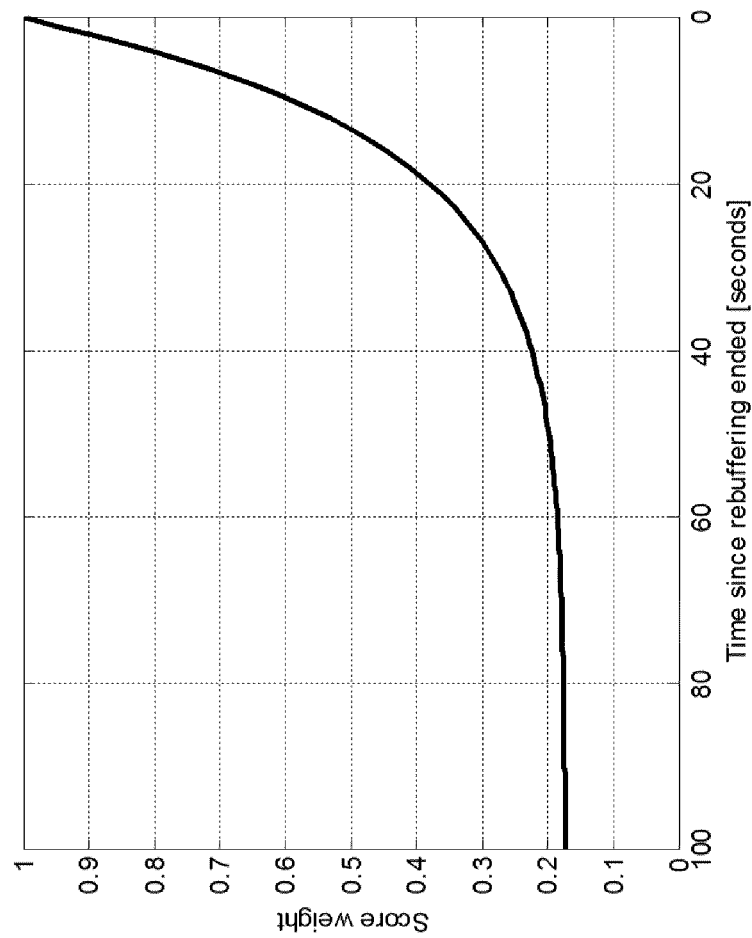
FIG. 8 illustrates a forgetting factor impact as a function of time since the last rebuffering, according to the embodiments of the present invention.

Finally, as the time since the last rebuffering passes, one tends to forget about it. The impact of time since the last rebuffering, or a so-called forgetting factor, may be modelled as an exponential function of the time since the last rebuffering, as shown in FIG. 8.

To get the final effect of a single rebuffering, the rebuffering duration impact, the rebuffering repetition impact and the impact of time since the last rebuffering are multiplied. This result is then added to the total impact result for all rebufferings, as shown in the following source code:

```
bufDeg = 0;
for j in range(len(bufLength)):
    lengthDeg = sigmoid([0, 4, c[12], c[12]+c[13]], buflength [j])
    repeatDeg = sigmoid([1, c[14], c[15]+c[16]], j)
    memoryDeg = exponential([1, c[7], 0, c[8]], mosLength - bufStart[j])
    bufDeg = bufDeg + lengthDeg + repeatDeg * memoryDeg
bufDeg = bufDeg/4 * (mosBasic-1)
```

Here lengthDeg, repeatDeg and memoryDeg denote impacts due to rebuffering duration, rebuffering repetition and the impact of time since the last rebuffering respectively, and bufStart[j] denotes the time since the last rebuffering. In addition, c[12] and c[13] are rebuffering impact constants, c[14]-c[16] are constants related to rebuffering repetition, and c[7] and c[8] are time-since-the-last rebuffering impact (also referred to as rebuffering memory weights). For example, one may set c[12]=−67.632, c[13]=158.18, c[14]= 4.9894, c[15]=2.1274, c[16]=2.0001, c[7]=0.17267 and c[8]=10, but the present invention is by no means limited to these specific values.

Finally, the resulting term representing degradation due to rebuffering may be rescaled relative to mosBasic. This may be done since people are more annoyed by a rebuffering if they otherwise have good quality, while if the quality is poor, a rebuffering does not degrade peoples' perception so much.

Figure 9:
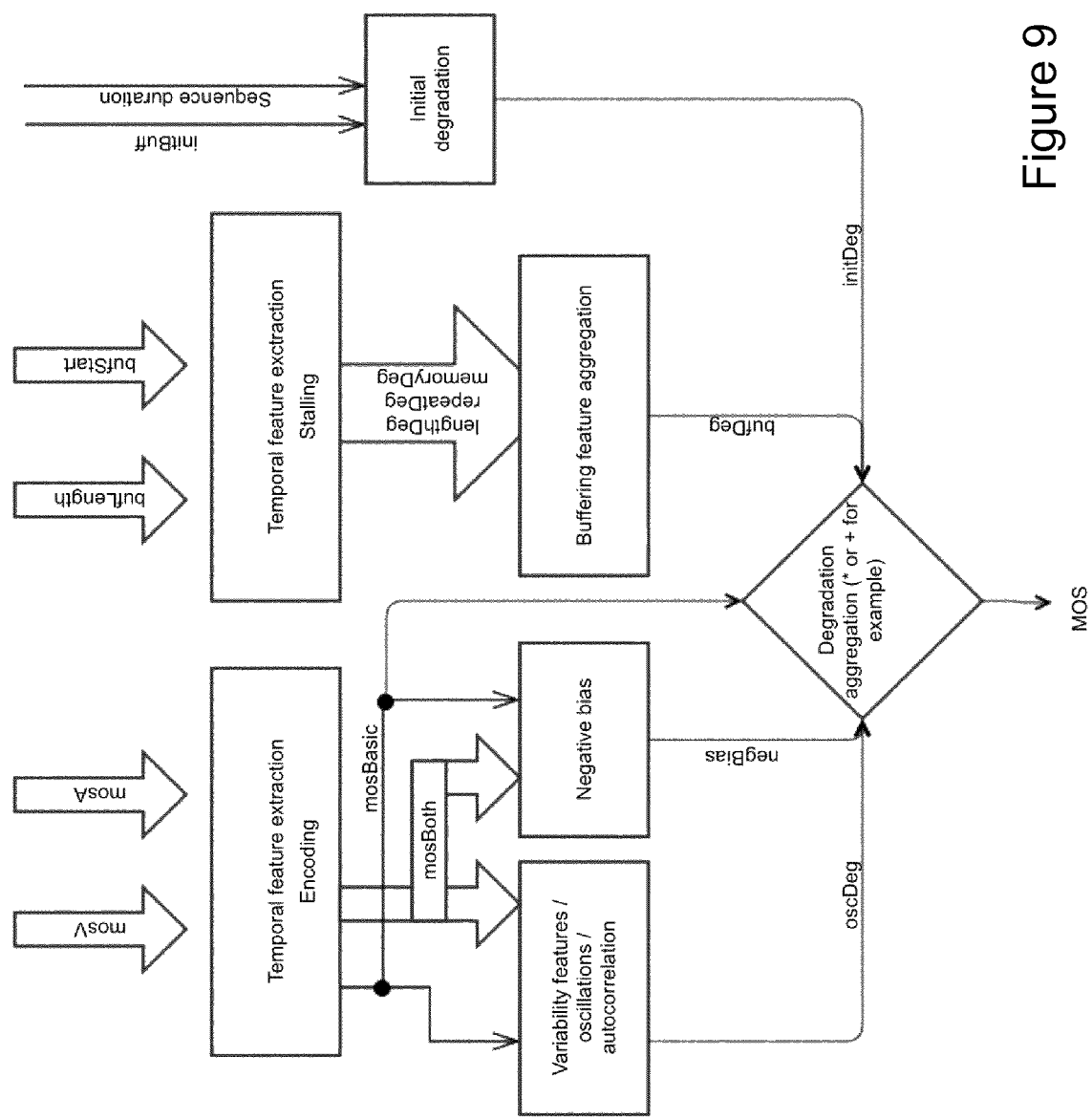
FIG. 9 is an aggregation module according to the embodiments of the present invention.

The method comprises a step S3 of estimating a multimedia session MOS from the generated audiovisual quality features and the generated buffering features, as illustrated in FIG. 9. The multimedia session MOS may be estimated as the difference between the weighted combination of the per-time-unit scores of audiovisual quality and the sum of: the negative bias, the term representing degradation due to oscillations in the per-time-unit-scores of audiovisual quality, the term representing degradation due to initial buffering, and the term representing degradation due to rebuffering. The score is also truncated to be between 1 and 5. In other words, the multimedia session MOS may be estimated according to a source code below:

```
mos = mosBasic - initDeg - bufDeg - oscDeg - negBias
if mos < 1:
    mos = 1
if mos > 5:
    mos = 5
return (mos)
```

Figure 10:
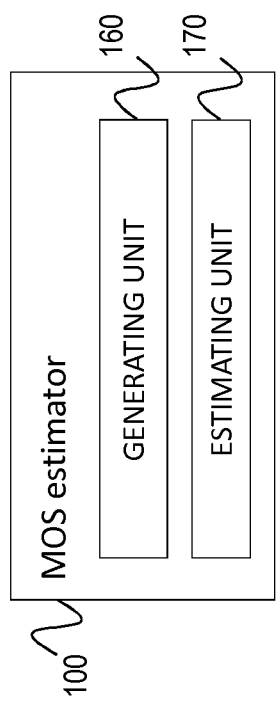
FIG. 10 depicts a schematic block diagram illustrating functional units of a MOS estimator for predicting a multimedia session MOS according to the embodiments of the present invention.

FIG. 10 is a schematic block diagram of a MOS estimator 100, for predicting a multimedia session MOS, wherein the multimedia session comprises a video session and an audio session. The video quality is represented by a vector of per-time-unit scores of video quality and the audio quality is represented by is a vector of per-time-unit scores of audio quality. The multimedia session is represented by a vector of rebuffering start times of each rebuffering event, a vector of rebuffering durations of each rebuffering event, and an initial buffering duration being the time between an initiation of the multimedia session and a start time of the multimedia session.

The MOS estimator 100 comprises, according to this aspect, a generating unit 170, configured to generate audiovisual quality features from the vector of per-time-unit scores of video quality and the vector of per-time-unit scores of audio quality. The audiovisual quality features comprise:

a vector of per-time-unit scores of audiovisual quality, calculated as a polynomial function of the vector of per-time-unit scores of video quality and the vector of per-time-unit scores of audio quality;

a weighted combination of the per-time-unit scores of audiovisual quality, wherein the weights are exponential functions of a time since the start time of multimedia session and a multimedia session duration;

a negative bias representing how a sudden drop in per-time-unit scores of audiovisual quality affects the multimedia session MOS; and a term representing a degradation due to oscillations in the per-time-unit-scores of audiovisual quality.

The generating unit 170 is further configured to generate buffering features from the vector of rebuffering start times of each rebuffering event, calculated from the start time of multimedia session, and the vector of rebuffering durations of each rebuffering event.

The MOS estimator 100 comprises, according to this aspect, an estimating unit 180, configured to estimate a multimedia session MOS from the generated audiovisual quality features and the generated buffering features.

The generating 170 and estimating 180 units may be hardware based, software based (in this case they are called generating and estimating modules respectively) or may be a combination of hardware and software.

The generating unit 170 may calculate the negative bias as:

$$negBias = \max\left(0, -10th \text{ percentile of } \left[\text{per-time-unit scores of audiovisual quality } [t] \cdot \left(c[1] + (1 - c[1]) \cdot e^{-\frac{(T-t)\log(0.5)}{-c[2]}}\right)\right]\right) \cdot c[23]$$

wherein t is time since the start time of multimedia session, T is the multimedia session duration and c[1], c[2] and c[23] are constants.

The generating unit 170 may calculate the degradation due to oscillations in the per time unit scores of audiovisual quality as the number of occurrences when the absolute difference between the per time unit scores of the audiovisual quality and the weighted combination of the per time unit scores of audiovisual quality exceeds a given threshold value, divided by the multimedia session duration. The threshold value may be e.g. 0.1. The degradation due to oscillations in the per time unit scores of audiovisual quality may also be truncated so that the maximum value is 0.2 oscillations per second.

The generated buffering features comprise a term representing a degradation due to initial buffering and a term representing a degradation due to rebuffering. Thus, the generating unit 170 may model the term representing degradation due to initial buffering as a product of a term representing an initial buffering impact and a term representing a forgetness factor impact. The initial buffering impact may be a sigmoid function of the initial buffering duration, and the forgetness factor may be an exponential function of the time since the start time of multimedia session.

The generating unit 170 may model the term representing degradation due to rebuffering as a sum, over all rebuffering events, of products of a rebuffering duration impact, a rebuffering repetition impact, and an impact of time since the last rebuffering ended. The rebuffering duration impact may be a sigmoid function of a rebuffering duration. The rebuffering repetition impact may be a sigmoid function of a rebuffering repetition number. The impact of time since the last rebuffering ended may be an exponential function of the time since the last rebuffering ended.

The MOS estimator 100 may estimate the multimedia session MOS as the difference between the weighted combination of the per-time-unit scores of audiovisual quality and the sum of the negative bias, the term representing degradation due to oscillations in the per-time-unit-scores of audiovisual quality, the term representing degradation due to initial buffering, and the term representing degradation due to rebuffering.

The MOS estimator 100 can be implemented in hardware, in software or a combination of hardware and software. The MOS estimator 100 can be implemented in user equipment, such as a mobile telephone, tablet, desktop, netbook, multimedia player, video streaming server, set-top box or computer. The MOS estimator 100 may also be implemented in a network device in the form of or connected to a network node, such as radio base station, in a communication network or system.

Although the respective units disclosed in conjunction with FIG. 10 have been disclosed as physically separate units in the device, where all may be special purpose circuits, such as ASICs (Application Specific Integrated Circuits), alternative embodiments of the device are possible where some or all of the units are implemented as computer program modules running on a general-purpose processor. Such an embodiment is disclosed in FIG. 11.

Figure 11:
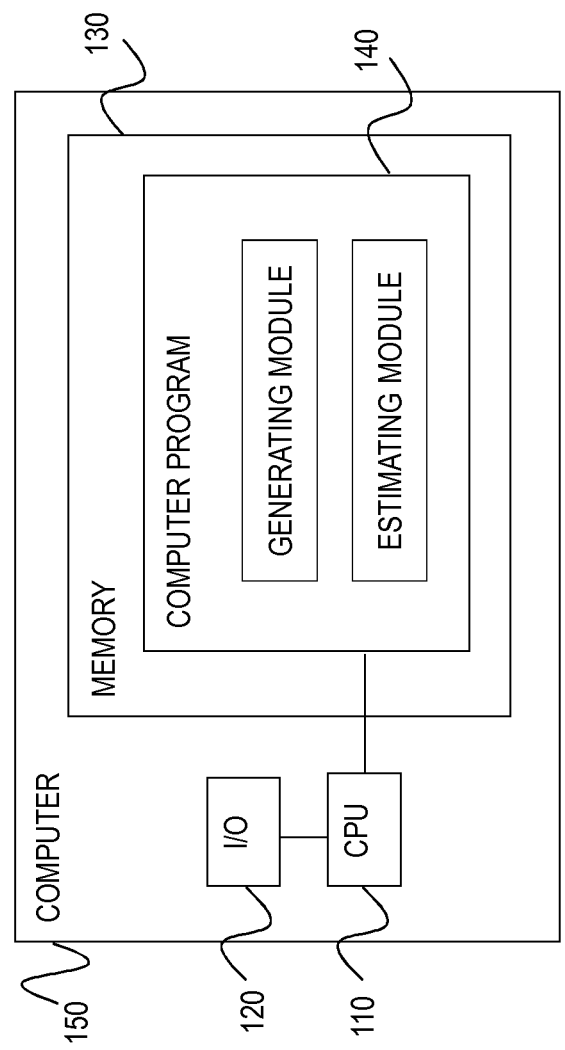
FIG. 11 illustrates a schematic block diagram illustrating a computer comprising a computer program product with a computer program for predicting a multimedia session MOS, according to embodiments of the present invention.

FIG. 11 schematically illustrates an embodiment of a computer 150 having a processing unit 110 such as a DSP (Digital Signal Processor) or CPU (Central Processing Unit). The processing unit 110 can be a single unit or a plurality of units for performing different steps of the method described herein. The computer also comprises an input/output (I/O) unit 120 for receiving a vector of per-time-unit scores of video quality, a vector of per-time-unit scores of audio quality, a vector of rebuffering durations of each rebuffering event, and an initial buffering duration. The I/O unit 120 has been illustrated as a single unit in FIG. 11 but can likewise be in the form of a separate input unit and a separate output unit.

Furthermore, the computer 150 comprises at least one computer program product 130 in the form of a non-volatile memory, for instance an EEPROM (Electrically Erasable Programmable Read-Only Memory), a flash memory or a disk drive. The computer program product 130 comprises a computer program 140, which comprises code means which, when run on the computer 150, such as by the processing unit 110, causes the computer 150 to perform the steps of the method described in the foregoing in connection with FIG. 2.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

Aggregation Code

The Python code below summarizes the algorithm for estimating MOS, according to the embodiments of the present invention:

```
def aggregation11(mosV, mosA, bufInit, bufLength, bufStart):
    # mosV and mosA are vectors of 1-sec scores, index 0 is start of video or audio
    # bufInit is seconds of initial buffering
    # bufLength is a vector of rebuffering lengths
    # bufStart is a vector of rebuffering start times
    # c0 - Dummy
    # c1-c3 - Adaptation memory weights
    # c4-c6 - Initbuf memory weights
    # c7-c9 - Buffering memory weights
    # c10-c11 - Initbuf impact
    # c12-c13 - Rebuf impact
    # c14-c16 - Repetition annoyance
    # c17-c18 - Audio/video merging weights
    # c19-c20 - Oscillation weights
    # c21 - Last part bias (not used)
    # c22-23 - Negative bias coefs
    c = [0, 0.2855, 10.256, 17.85, 0.054304, 10.286, 9.8766, 0.17267, 10,
17.762, 4.5327, 1.0054, -67.632, 158.18, 4.9894, 2.1274, 2.0001, 0.16233,
-0.013804, 2.1944, 43.565, 0.13025, 9.1647, 0.74811]
    mosLength = np.minimum (len(mosV), len(mosA) )
    sum1    = 0
    sum2    = 0
    mosBoth = list(mosV)
    for i in range (mosLength) :
        mosBoth[i] = (1 * (mosV[i] - 1) + c[17] * (mosA[i] - 1) + c[18] *
(mosV[i] - 1) * (mosA[i] - 1) / 4) / (1 + c[17] + c[18]) + 1
        mosTime   = mosLength - i - 1
        mosWeight = exponential([1, c[1], 0, c[2]], mosTime)
        sum1     += mosBoth[i] * mosWeight
        sum2     += mosWeight
    mosBasic = sum1 / sum2
    osc    = 0
    offset = 0.1
    state  = 0
    for i in range(mosLength) :
        if state != 1:  # State = unknown or dip
            if mosBoth[i] > mosBasic + offset:
                osc += 1
                state = 1
        elif state != -1: # State = unknow or top
            if mosBoth[i] < mosBasic - offset:
                osc += 1
                state =-1
    oscRel = osc / mosLength
    oscRel = np.minimum(oscRel, 0.2) # Limit to one change per 5 sec
    oscDeg = np.power(oscRel * np.std(mosBoth, ddof=1), c[19] ) * c[20]
    mosOffset = list(mosBoth)
    for i in range(mosLength):
        mosTime   = mosLength-i-1
        mosWeight = exponential([1, c[1], 0, c[2]], mosTime)
        mosOffset[i] = (mosOffset[i] - mosBasic)*mosWeight
    mosPerc = np.percentile(mosOffset, c[22], interpolation='linear')
    # Should normally be negative
    negBias = np.maximum(0, -mosPerc)
    negBias = negBias*c[23]
    lengthDeg = sigmoid([0, 4, c[10], c[10] + c[11]], bufInit)
    memoryDeg = exponential([1, c[4], 0, c[5]], mosLength)
    initDeg   = lengthDeg*memoryDeg
    bufDeg = 0;
    for j in range(len(bufLength) ):
        lengthDeg = sigmoid([0, 4, c[12], c[12] + c[13]], bufLength[j])
        repeatDeg = sigmoid([1, c[14], c[15] , c[15] +c[16]], j)
        memoryDeg = exponential([1, c[7], 0, c[8]], mosLength - bufStart[j])
```

-continued

```
bufDeg  = bufDeg + lengthDeg * repeatDeg * memoryDeg
bufDeg = bufDeg/4 * (mosBasic−1)   # Convert to relative change
mos = mosBasic − initDeg − bufDeg − oscDeg − negBias
if mos < 1:
    mos = 1
if mos > 5:
    mos = 5
return (mos)
def sigmoid(par, x):
    scalex = 10 / (par[3] − par[2])
    midx = (par[2] + par[3]) / 2
    y = par[0] + (par[1] − par[0] ) / (1+ np.exp(−scalex * (x − midx)))
    return y
def exponential(c, x) :
    z = np.log(0.5) / (−(c[3] − c[2]))
    y = c[1] + (c[0] − c[1]) * np.exp(−(x − c[2]) * z)
    return y
```

The invention claimed is:

1. A method, performed by a Mean Opinion Score (MOS) estimator, for predicting a multimedia session MOS, wherein the multimedia session comprises a video session and an audio session, wherein video quality is represented by a vector of per-time-unit scores of video quality and wherein audio quality is represented by is a vector of per-time-unit scores of audio quality, and wherein the multimedia session is represented by a vector of rebuffering start times of each rebuffering event, a vector of rebuffering durations of each rebuffering event, and an initial buffering duration being the time between an initiation of the multimedia session and a start time of the multimedia session; the method comprising:

generating audiovisual quality features from the vector of per-time-unit scores of video quality and the vector of per-time-unit scores of audio quality, the audiovisual quality features comprising:
  a vector of per-time-unit scores of audiovisual quality, calculated as a polynomial function of the vector of per-time-unit scores of video quality and the vector of per-time-unit scores of audio quality;
  a weighted combination of the per-time-unit scores of audiovisual quality, wherein the weights are exponential functions of a time since the start time of multimedia session and a multimedia session duration;
  a negative bias representing how a sudden drop in per-time-unit scores of audiovisual quality affects the multimedia session MOS; and
  a term representing a degradation due to oscillations in the per-time-unit-scores of audiovisual quality;
generating buffering features from the vector of rebuffering start times of each rebuffering event, calculated from the start time of multimedia session, and the vector of rebuffering durations of each rebuffering event;
estimating a multimedia session MOS from the generated audiovisual quality features and the generated buffering features.

2. The method of claim 1, wherein the negative bias is calculated as:

$$negBias = \max\!\left(0, -10th \text{ percentile of } \left[\text{per-time-unit scores of audiovisual quality } [t] \cdot \left(c[1] + (1 - c[1]) \cdot e^{-\frac{(T-t)\log(0.5)}{-c[2]}}\right)\right]\right) \cdot c[23]$$

wherein $c[1]$, $c[2]$ and $c[23]$ are given coefficients, t is time since the start time of multimedia session and T is the multimedia session duration.

3. The method of claim 1, wherein the term representing a degradation due to oscillations in the per time unit scores of audiovisual quality is calculated as the number of occurrences when the absolute difference between the per time unit scores of the audiovisual quality and the weighted combination of the per time unit scores of audiovisual quality exceeds a given threshold value, divided by the multimedia session duration.

4. The method of claim 1, wherein the generated buffering features comprise a term representing a degradation due to initial buffering and a term representing a degradation due to rebuffering.

5. The method of claim 4:
wherein the term representing degradation due to initial buffering is modeled as a product of a term representing an initial buffering impact and a term representing a forgetness factor impact;
wherein the initial buffering impact is a sigmoid function of the initial buffering duration; and
wherein the forgetness factor is an exponential function of the time since the start time of multimedia session.

6. The method of claim 4:
wherein the term representing degradation due to rebuffering is modeled as a sum, over all rebuffering events, of products of a rebuffering duration impact, a rebuffering repetition impact, and an impact of time since the last rebuffering ended;
wherein the rebuffering duration impact is a sigmoid function of a rebuffering duration;
wherein the rebuffering repetition impact is a sigmoid function of a rebuffering repetition number; and
wherein the impact of time since the last rebuffering ended is an exponential function of the time since the last rebuffering ended.

7. The method of claim 1, wherein the multimedia session MOS is estimated as the difference between the weighted combination of the per-time-unit scores of audiovisual quality and the sum of:
the negative bias;
the term representing degradation due to oscillations in the per-time-unit-scores of audiovisual quality;
the term representing degradation due to initial buffering, and
the term representing degradation due to rebuffering.

8. A Mean Opinion Score (MOS) estimator for predicting a multimedia session MOS, wherein the multimedia session comprises a video session and an audio session, wherein video quality is represented by a vector of per-time-unit scores of video quality and wherein audio quality is represented by is a vector of per-time-unit scores of audio quality, and wherein the multimedia session is represented by a vector of rebuffering start times of each rebuffering event, a vector of rebuffering durations of each rebuffering event, and an initial buffering duration being the time between an initiation of the multimedia session and a start time of the multimedia session; the MOS estimator comprising:

processing circuitry;
memory containing instructions executable by the processing circuitry whereby the MOS estimator is operative to:
  generate audiovisual quality features from the vector of per-time-unit scores of video quality and the vector of per-time-unit scores of audio quality, the audiovisual quality features comprising:
    a vector of per-time-unit scores of audiovisual quality, calculated as a polynomial function of the vector of per-time-unit scores of video quality and the vector of per-time-unit scores of audio quality;
    a weighted combination of the per-time-unit scores of audiovisual quality, wherein the weights are exponential functions of a time since the start time of multimedia session and a multimedia session duration;
    a negative bias representing how a sudden drop in per-time-unit scores of audiovisual quality affects the multimedia session MOS; and
    a term representing a degradation due to oscillations in the per-time-unit-scores of audiovisual quality;
  generate buffering features from the vector of rebuffering start times of each rebuffering event, calculated from the start time of multimedia session, and the vector of rebuffering durations of each rebuffering event;
  estimate a multimedia session MOS from the generated audiovisual quality features and the generated buffering features.

9. The MOS estimator of claim 8, wherein the instructions are such that MOS estimator is operative to calculate the negative bias as:

$$negBias = \max\left(0, -10th \text{ percentile of } \left[\text{per-time-unit scores of audiovisual quality } [t] \cdot \left(c[1] + (1-c[1]) \cdot e^{\frac{(T-t)\log(0.5)}{-c[2]}}\right)\right]\right) \cdot c[23]$$

wherein c[1], c[2] and c[23] are given coefficients, t is time since the start time of multimedia session and T is the multimedia session duration.

10. The MOS estimator of claim 8, wherein the instructions are such that MOS estimator is operative to calculate the term representing a degradation due to oscillations in the per time unit scores of audiovisual quality as the number of occurrences when the absolute difference between the per time unit scores of the audiovisual quality and the weighted combination of the per time unit scores of audiovisual quality exceeds a given threshold value, divided by the multimedia session duration.

11. The MOS estimator of claim 8, wherein the instructions are such that MOS estimator is operative to generate the buffering features such that the generated buffering features comprise a term representing a degradation due to initial buffering and a term representing a degradation due to rebuffering.

12. The MOS estimator of claim 11:
wherein the instructions are such that MOS estimator is operative to model the term representing degradation due to initial buffering as a product of a term representing an initial buffering impact and a term representing a forgetness factor impact;
wherein the initial buffering impact is a sigmoid function of the initial buffering duration; and
wherein the forgetness factor is an exponential function of the time since the start time of multimedia session.

13. The MOS estimator of claim 11:
wherein the instructions are such that MOS estimator is operative to model the term representing degradation due to rebuffering as a sum, over all rebuffering events, of products of a rebuffering duration impact, a rebuffering repetition impact, and an impact of time since the last rebuffering ended;
wherein the rebuffering duration impact is a sigmoid function of a rebuffering duration;
wherein the rebuffering repetition impact is a sigmoid function of a rebuffering repetition number; and
wherein the impact of time since the last rebuffering ended is an exponential function of the time since the last rebuffering ended.

14. The MOS estimator of claim 8, wherein the instructions are such that MOS estimator is operative to estimate the multimedia session MOS as the difference between the weighted combination of the per-time-unit scores of audiovisual quality and the sum of:
  the negative bias;
  the term representing degradation due to oscillations in the per-time-unit-scores of audiovisual quality;
  the term representing degradation due to initial buffering, and
  the term representing degradation due to rebuffering.

15. A non-transitory computer readable recording medium storing a computer program product for controlling a Mean Opinion Score (MOS) estimator for predicting a multimedia session MOS, wherein the multimedia session comprises a video session and an audio session, wherein video quality is represented by a vector of per-time-unit scores of video quality and wherein audio quality is represented by is a vector of per-time-unit scores of audio quality, and wherein the multimedia session is represented by a vector of rebuffering start times of each rebuffering event, a vector of rebuffering durations of each rebuffering event, and an initial buffering duration being the time between an initiation of the multimedia session and a start time of the multimedia session; the computer program product comprising software instructions which, when run on processing circuitry of the MOS estimator, causes the MOS estimator to:
  generate audiovisual quality features from the vector of per-time-unit scores of video quality and the vector of per-time-unit scores of audio quality, the audiovisual quality features comprising:
    a vector of per-time-unit scores of audiovisual quality, calculated as a polynomial function of the vector of per-time-unit scores of video quality and the vector of per-time-unit scores of audio quality;
    a weighted combination of the per-time-unit scores of audiovisual quality, wherein the weights are exponential functions of a time since the start time of multimedia session and a multimedia session duration;
    a negative bias representing how a sudden drop in per-time-unit scores of audiovisual quality affects the multimedia session MOS; and
    a term representing a degradation due to oscillations in the per-time-unit-scores of audiovisual quality;

generate buffering features from the vector of rebuffering start times of each rebuffering event, calculated from the start time of multimedia session, and the vector of rebuffering durations of each rebuffering event;

estimate a multimedia session MOS from the generated audiovisual quality features and the generated buffering features.

\* \* \* \* \*

UNITED STATES PATENT AND TRADEMARK OFFICE
CERTIFICATE OF CORRECTION

PATENT NO. : 10,708,636 B2
APPLICATION NO. : 16/309790
DATED : July 7, 2020
INVENTOR(S) : Lundberg et al.

It is certified that error appears in the above-identified patent and that said Letters Patent is hereby corrected as shown below:

On the Title Page

In Item (56), under "OTHER PUBLICATIONS", in Column 2, Line 1, delete "Standartization" and insert -- Standardization --, therefor.

On Page 2, in Item (56), under "OTHER PUBLICATIONS", in Column 2, Line 1, delete "Standartization" and insert -- Standardization --, therefor.

In the Specification

Figure 1A:
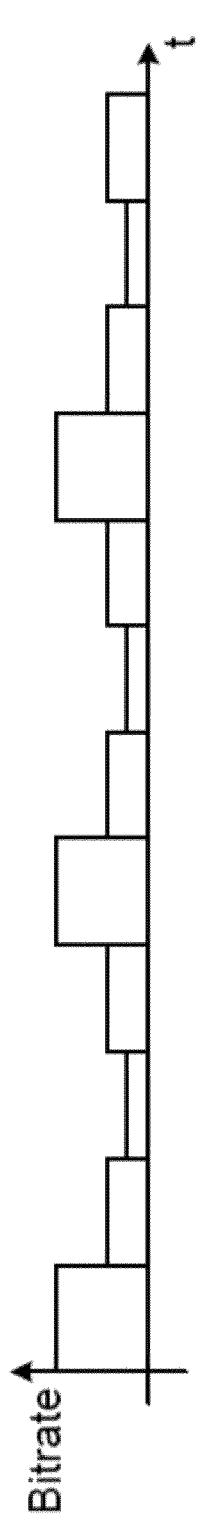
FIGS. 1A-C are schematic graphs illustrating buffering and bitrate over time.
Figure 1B:
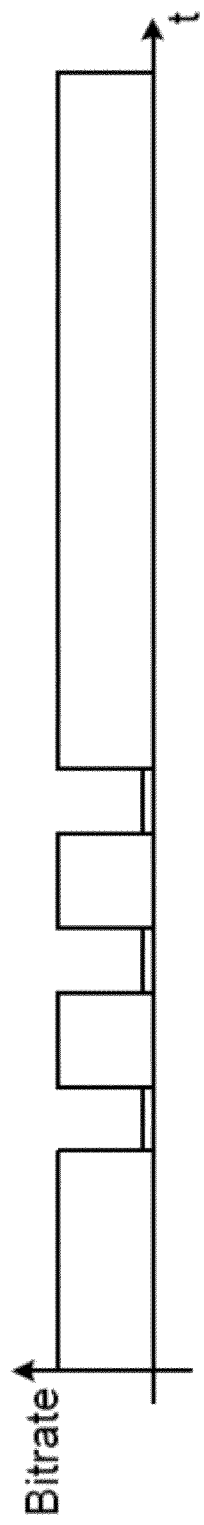
Figure 1C:
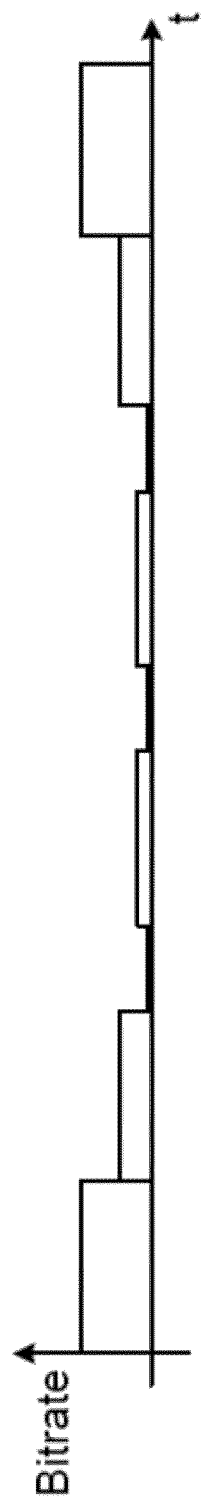

In Column 2, Line 30, delete "FIG. 10." and insert -- FIG. 1C. --, therefor.

In Column 2, Line 42, delete "of a what" and insert -- of what --, therefor.

In Column 6, Lines 16-20, delete "$mosBoth[i] = \dfrac{(mosV[i] - 1) + c[17] \cdot (mosA[i] - 1) + c[18] \cdot (mosV[i] - 1) \cdot \dfrac{mosA[i] - 1}{4}}{1 + c[17] + c[18]} + 1$" and insert -- $mosBoth[i] = \left| \dfrac{(mosV[i] - 1) + c[17] \cdot (mosA[i] - 1) + c[18] \cdot (mosV[i] - 1) \cdot \left(\dfrac{mosA[i] - 1}{4}\right))}{1 + c[17] + c[18]} \right| + 1$ --, therefor.

In Column 7, Line 18, delete "c[1]1, 0, c[2] ," and insert -- c[1], 0, c[2]], --, therefor.

In Column 8, Line 37, delete "iniDeg" and insert -- initDeg --, therefor.

In Column 9, Line 20, delete "buflength [j])" and insert -- bufLength [j]) --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,708,636 B2

In Column 9, Line 21, delete "c[14]," and insert -- c[14], c[15], --, therefor.

In Column 9, Line 23, delete "lengthDeg +" and insert -- lengthDeg * --, therefor.

In Column 10, Line 10, delete "generating unit 170," and insert -- generating unit 160, --, therefor.

In Column 10, Line 28, delete "generating unit 170" and insert -- generating unit 160 --, therefor.

In Column 10, Line 34, delete "estimating unit 180," and insert -- estimating unit 170, --, therefor.

In Column 10, Line 37, delete "generating 170 and estimating 180" and insert -- generating 160 and estimating 170 --, therefor.

In Column 10, Line 41, delete "generating unit 170" and insert -- generating unit 160 --, therefor.

In Column 10, Line 54, delete "generating unit 170" and insert -- generating unit 160 --, therefor.

In Column 11, Line 1, delete "generating unit 170" and insert -- generating unit 160 --, therefor.

In Column 11, Line 9, delete "generating unit 170" and insert -- generating unit 160 --, therefor.

In Column 12, Line 47, delete "unknow" and insert -- unknown --, therefor.

In Column 12, Line 64, delete "c[15] +c[16]]," and insert -- c[15] + c[16]], --, therefor.

In the Claims

In Column 14, Line 51, in Claim 7, delete "buffering," and insert -- buffering; --, therefor.

In Column 16, Line 29, in Claim 14, delete "buffering," and insert -- buffering; --, therefor.